United States Patent
Chang et al.

(10) Patent No.: US 11,343,871 B2
(45) Date of Patent: May 24, 2022

(54) METHOD AND APPARATUS FOR DETERMINING RADIO LINK FAILURE IN WIRELESS COMMUNICATION SYSTEM

(71) Applicant: Samsung Electronics Co., Ltd., Suwon-si (KR)

(72) Inventors: Youngbin Chang, Suwon-si (KR); Peng Xue, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/844,750

(22) Filed: Apr. 9, 2020

(65) Prior Publication Data
US 2020/0329521 A1   Oct. 15, 2020

(30) Foreign Application Priority Data

Apr. 12, 2019  (KR) .................. 10-2019-0043179

(51) Int. Cl.
*H04W 76/18* (2018.01)
*H04W 72/14* (2009.01)
(Continued)

(52) U.S. Cl.
CPC .......... *H04W 76/18* (2018.02); *H04B 17/318* (2015.01); *H04L 1/0003* (2013.01);
(Continued)

(58) Field of Classification Search
None
See application file for complete search history.

(56) References Cited

U.S. PATENT DOCUMENTS

2008/0019279 A1*  1/2008  Kim ..................... H04L 1/0061
                                                                  370/241
2010/0240357 A1   9/2010  Wu
(Continued)

FOREIGN PATENT DOCUMENTS

EP        2854460 A1      4/2015
KR   10-2009-0053280 A    5/2009
(Continued)

OTHER PUBLICATIONS

ZTE Corp. et al., "MAC aspects of LBT for NR-U", 3GPP TSG-WG2 Meeting #105-bis, Apr. 8-12, 2019, R2-1903546, 6 pages.
(Continued)

*Primary Examiner* — Otis L Thompson, Jr.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for a base station to determine a radio link failure includes: receiving at least one first uplink signal from a terminal; determining whether to trigger uplink resource allocation by using information based on the at least one first uplink signal; transmitting, in case that the uplink resource allocation is triggered, an uplink grant to the terminal; receiving at least one second uplink signal from the terminal based on the uplink grant; and determining whether a radio link failure has occurred based on the at least one second uplink signal.

20 Claims, 8 Drawing Sheets

(51) Int. Cl.
  *H04W 72/04* (2009.01)
  *H04B 17/318* (2015.01)
  *H04W 74/08* (2009.01)
  *H04L 5/00* (2006.01)
  *H04L 1/00* (2006.01)
  *H04L 25/02* (2006.01)

(52) U.S. Cl.
  CPC .......... *H04L 1/0061* (2013.01); *H04L 5/0051* (2013.01); *H04L 25/0226* (2013.01); *H04W 72/0413* (2013.01); *H04W 72/14* (2013.01); *H04W 74/0833* (2013.01)

(56) References Cited

U.S. PATENT DOCUMENTS

| | | |
|---|---|---|
| 2011/0081904 A1 | 4/2011 | Kuo |
| 2013/0142098 A1 | 6/2013 | Kwon et al. |
| 2013/0252606 A1* | 9/2013 | Nimbalker .......... H04B 17/309 455/434 |
| 2015/0264666 A1 | 9/2015 | Yi et al. |
| 2016/0112924 A1* | 4/2016 | Turakhia .............. H04W 36/30 370/332 |
| 2016/0219475 A1 | 7/2016 | Kim |
| 2016/0323765 A1* | 11/2016 | Su ........................ H04W 76/27 |
| 2017/0289021 A1* | 10/2017 | Saily .................. H04W 74/006 |
| 2019/0103946 A1 | 4/2019 | Li et al. |
| 2019/0380052 A1* | 12/2019 | Yang .................... H04W 24/08 |
| 2021/0120581 A1* | 4/2021 | Kim .................. H04W 74/0833 |

FOREIGN PATENT DOCUMENTS

| | | |
|---|---|---|
| KR | 10-2011-0037920 A | 4/2011 |
| KR | 10-2012-0015228 A | 2/2012 |
| KR | 10-2015-0005458 A | 1/2015 |
| KR | 10-2015-0065814 A | 6/2015 |
| WO | 2012086769 A1 | 6/2012 |
| WO | 2014015794 A1 | 1/2014 |
| WO | 2014165510 A1 | 10/2014 |

OTHER PUBLICATIONS

Nokia et al., "UL LBT failure handling", 3GPP TSG-RAN WG2 Meeting #105bis, Apr. 8-12, 2019, R2-1903714, 2 pages.
Lenovo et al., "Impact of systematic LBT failure on UL transmission procedure", 3GPP TSG-RAN WG2 Meeting #105bis, Apr. 8-12, 2019, R2-1904128, 2 pages.
International Search Report dated Jul. 14, 2020 in connection with International Patent Application No. PCT/KR2020/004914, 3 pages.
Written Opinion of the International Searching Authority dated Jul. 14, 2020 in connection with International Patent Application No. PCT/KR2020/004914, 5 pages.
European Patent Office, "Supplementary European Search Report" dated Apr. 13, 2022, in connection with European Patent Application No. 20788136.8, 8 pages.

* cited by examiner

METHOD AND APPARATUS FOR DETERMINING RADIO LINK FAILURE IN WIRELESS COMMUNICATION SYSTEM

CROSS-REFERENCE TO RELATED APPLICATIONS

This application is based on and claims priority under 35 U.S.C. § 119 to Korean Patent Application No. 10-2019-0043179, filed on Apr. 12, 2019, in the Korean Intellectual Property Office, the disclosure of which is incorporated by reference herein in its entirety.

BACKGROUND

1. Field

The disclosure relates to a method for a base station to determine a radio link failure in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

In a wireless communication system, a method of determining the occurrence of a situation in which communication tends to fail by measuring the quality of a downlink radio signal between the base station and the terminal is called radio link failure (RLF) detection. However, it is not known how to measure the RLF situation in the uplink. That is, there is a need for a method for detecting a case where communication is possible in the downlink but communication tends to fail in the uplink, and the disclosure proposes a method and apparatus for detecting such a situation.

According to the disclosure, there is provided a method for a base station to determine a radio link failure (RLF). The method may include: receiving at least one first uplink signal from a terminal; determining whether to trigger uplink resource allocation by using information based on the at least one first uplink signal; transmitting, in case that the uplink resource allocation is triggered, an uplink grant to the terminal; receiving at least one second uplink signal from the terminal based on the uplink grant; and determining whether a radio link failure has occurred based on the at least one second uplink signal.

According to the disclosure, there is provided a base station. The base station may include: a transceiver; and a controller configured to receive at least one first uplink signal from a terminal, determine whether to trigger uplink resource allocation by using information based on the at least one first uplink signal, transmit, in case that the uplink resource allocation is triggered, an uplink grant to the terminal, receive at least one second uplink signal from the terminal based on the uplink grant, and determine whether a radio link failure has occurred based on the at least one second uplink signal.

According to an embodiment of the disclosure, the base station may detect a situation where communication is possible in the downlink but a radio link failure occurs in the uplink and recover the radio link failure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure are described in detail with reference to the accompanying drawings. Descriptions of functions and structures well known in the art and not directly related to the disclosure may be omitted for clarity and conciseness without obscuring the subject matter of the disclosure.

In the drawings, some elements are exaggerated, omitted, or only outlined in brief, and thus may be not drawn to scale. The same or similar reference symbols are used throughout the drawings to refer to the same or like parts.

The aspects, features, and advantages of certain embodiments of the disclosure will be more apparent from the following detailed description taken in conjunction with the accompanying drawings. The description of the various embodiments is to be construed as exemplary only and does not describe every possible instance of the disclosure. It should be apparent to those skilled in the art that the following description of various embodiments of the disclosure is provided for illustrative purposes only and not for the purpose of limiting the disclosure as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module", or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose large components and units. Components and units may be configured to drive a device or one or more processors in a secure multimedia card. Also, in a certain embodiment, a module or unit may include one or more processors.

Figure 1:
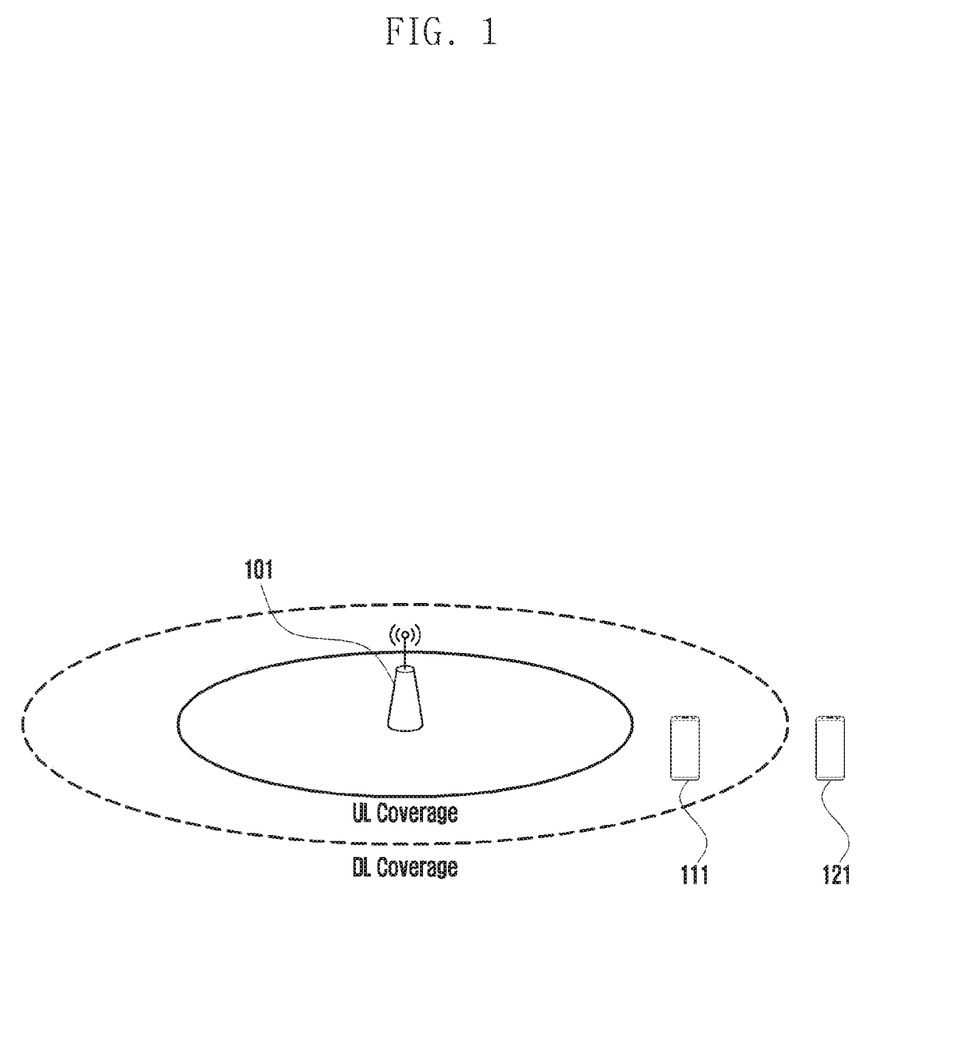
FIG. 1 illustrates a case where the downlink coverage and the uplink coverage are different.

FIG. 1 illustrates a case where the downlink coverage and the uplink coverage are different.

In a wireless communication system, a method of determining the occurrence of a situation in which communication tends to fail by measuring the quality of a downlink radio signal between the base station and the terminal is called radio link failure (RLF) detection. In the related art, only a method for detecting a radio link failure in the downlink is provided, but a method for detecting a radio link failure in the uplink is not provided.

In the related art, it may be possible to detect a radio link failure in the uplink in the same manner as in the downlink under the assumption that the downlink coverage and the uplink coverage are the same. However, the base station and the terminal may differ from each other in terms of allowed transmission power, and accordingly, as illustrated in FIG. 1, the uplink coverage may be narrower than the downlink coverage.

As shown in FIG. 1, in the case where there is a difference between the uplink coverage and the downlink coverage, when the method of detecting a radio link failure in the uplink is applied as it is in the downlink, an error may occur in radio link failure detection. For example, when a first terminal 121 is located outside the downlink coverage and the uplink coverage of the base station 101, a problem may not occur even if the same radio link failure detection method is applied to the uplink and the downlink between the first terminal 121 and the base station 101. However, when a second terminal 111 is located outside the uplink coverage of the base station 101 and inside the downlink coverage thereof, a problem may occur if the same radio link failure detection method is applied to the uplink and the downlink between the second terminal 111 and the base station 101. The reason is as follows. Whereas a radio link failure is not detected in the downlink because the second terminal 111 is located inside the downlink coverage of the base station 101, a radio link failure must be detected in the uplink because the second terminal 111 is located outside the uplink coverage of the base station 101.

Accordingly, to solve the above problem, the disclosure provides a method for determining a radio link failure in the uplink.

Figure 2:
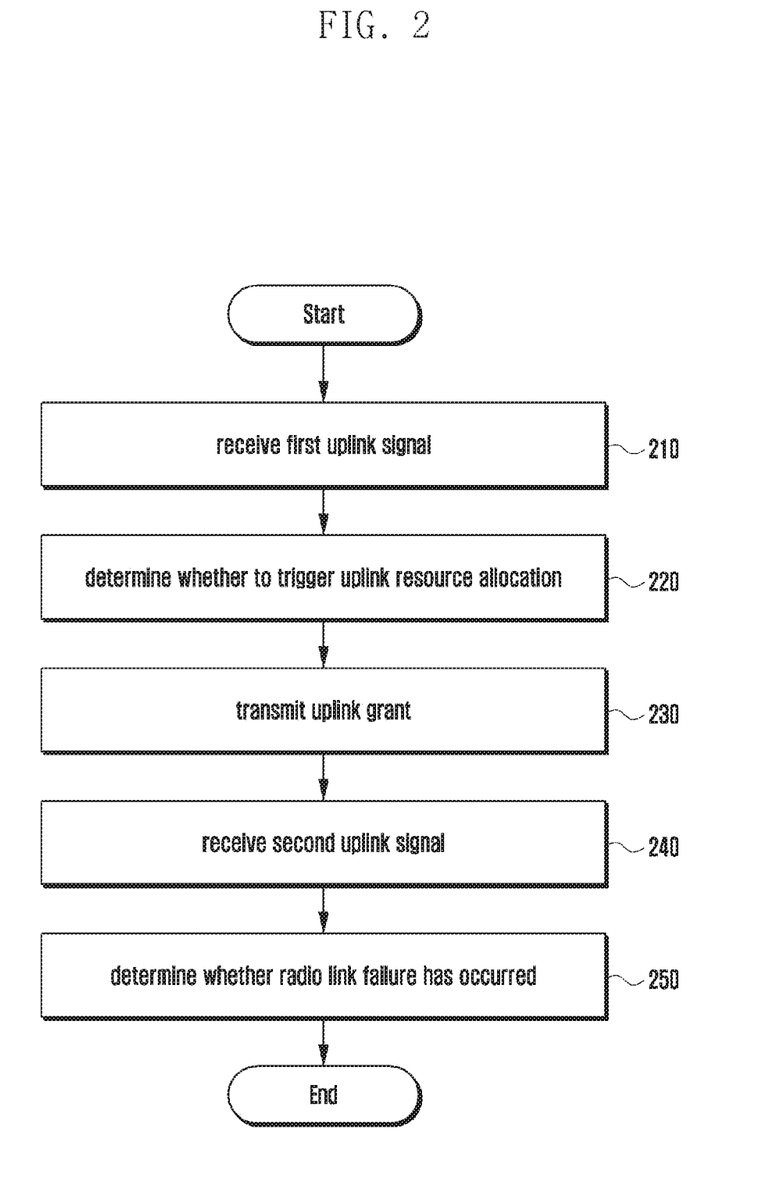
FIG. 2 illustrates a flowchart of a procedure for radio link failure detection according to an embodiment of the disclosure.

FIG. 2 illustrates a flowchart of a procedure for radio link failure detection according to an embodiment of the disclosure.

With reference to FIG. 2, in one embodiment, at operation 210, the base station may receive at least one first uplink signal from the terminal. For example, the base station may receive three first uplink signals from the terminal.

In one embodiment, at operation 220, the base station may determine whether to trigger uplink resource allocation using information based on the at least one first uplink signal. In various embodiments, the base station may count the number of times that the reception of the first uplink signal transmitted from the terminal has failed and use it as a triggering condition for uplink resource allocation at operation 210. For example, the base station may determine that the triggering condition for uplink resource allocation is satisfied if the number of times that the reception of the first uplink signal has failed is greater than or equal to a preset first threshold.

In another embodiment, the base station may count the number of times that none of the first uplink signals transmitted by the terminal is successfully received during a specific time and use it as a triggering condition for uplink resource allocation. For example, if the number of times that none of the first uplink signals transmitted by the terminal is successfully received during a specific time is greater than or equal to a preset second threshold, the base station may determine that the triggering condition for uplink resource allocation is satisfied.

In one embodiment, the triggering condition for uplink resource allocation may be summarized as in Table 1 below. In various embodiments, triggering conditions 1 and 2 in Table 1 may be inclusive. That is, if condition 1 or condition 2 is satisfied, the base station may determine that the triggering condition for uplink resource allocation is satisfied.

TABLE 1

| triggering condition | item for determination criteria | equality | value | unit of value |
|---|---|---|---|---|
| 1 | counter for reception failure of first uplink signal | ≥ | first threshold | number of times |
| 2 | counter for none reception of first uplink signals during specified time | ≥ | second threshold | number of times |

In one embodiment, upon determining to trigger uplink resource allocation, at operation 230, the base station may transmit an uplink grant to the terminal. In various embodiments, the base station may transmit an uplink grant at operation 230 for the terminal to transmit data, a sounding reference signal (SRS), channel state information (CSI), or a random access preamble.

In one embodiment, the base station may transmit downlink control information (DCI) to the terminal at operation 230 so that the terminal may transmit an uplink signal with a specific modulation and coding scheme (MCS) value. In various embodiments, the base station may transmit an uplink grant to the terminal so that the terminal may transmit an uplink signal to the base station with higher power than that of the first uplink signal transmitted at operation 210 by the terminal to the base station. For example, the base station may transmit information for minimizing the frequency range used for uplink signal transmission to the terminal. In one embodiment, the base station may determine an uplink grant according to the above criteria regardless of the MCS, scheduling request (SR), buffer status report (BSR) or data size request reported by the terminal to the base station.

In one embodiment, the uplink grant allocated by the base station may be summarized as in Table 2 below.

TABLE 2

| type | allocation scheme | configuration |
|---|---|---|
| data channel | fixed MCS | DCI |
| | MCS with smallest spectral efficiency (SE) value (e.g.: MCS0 in LTE) | DCI |
| | fixed frequency data size | DCI |
| | smallest frequency data size(e.g.: 1 RB) | DCI |
| | fixed time data size | DCI |
| | longest time data size (e.g.: all allocable uplink symbols) | DCI |
| | regardless of MCS reported by terminal | |
| | regardless of SR/BSR reported by terminal | |
| | regardless of data size requested by terminal | |

TABLE 2-continued

| type | allocation scheme | configuration |
|---|---|---|
| SRS | Sounding reference signal | DCI |
| CSI | Channel state information | DCI |
| PRACH | Physical random access channel | DCI |

In one embodiment, at operation 240, the base station may receive at least one second uplink signal from the terminal based on the uplink grant transmitted at operation 230. For example, the base station may receive three second uplink signals from the terminal. In various embodiments, the strength of power used to transmit the at least one second uplink signal may be greater than the strength of power used to transmit the at least one first uplink signal at operation 210.

In one embodiment, at operation 250, the base station may determine whether a radio link failure has occurred based on the at least one second uplink signal. The method for radio link failure detection at operation 250 will be described later with reference to FIG. 3.

Figure 3:
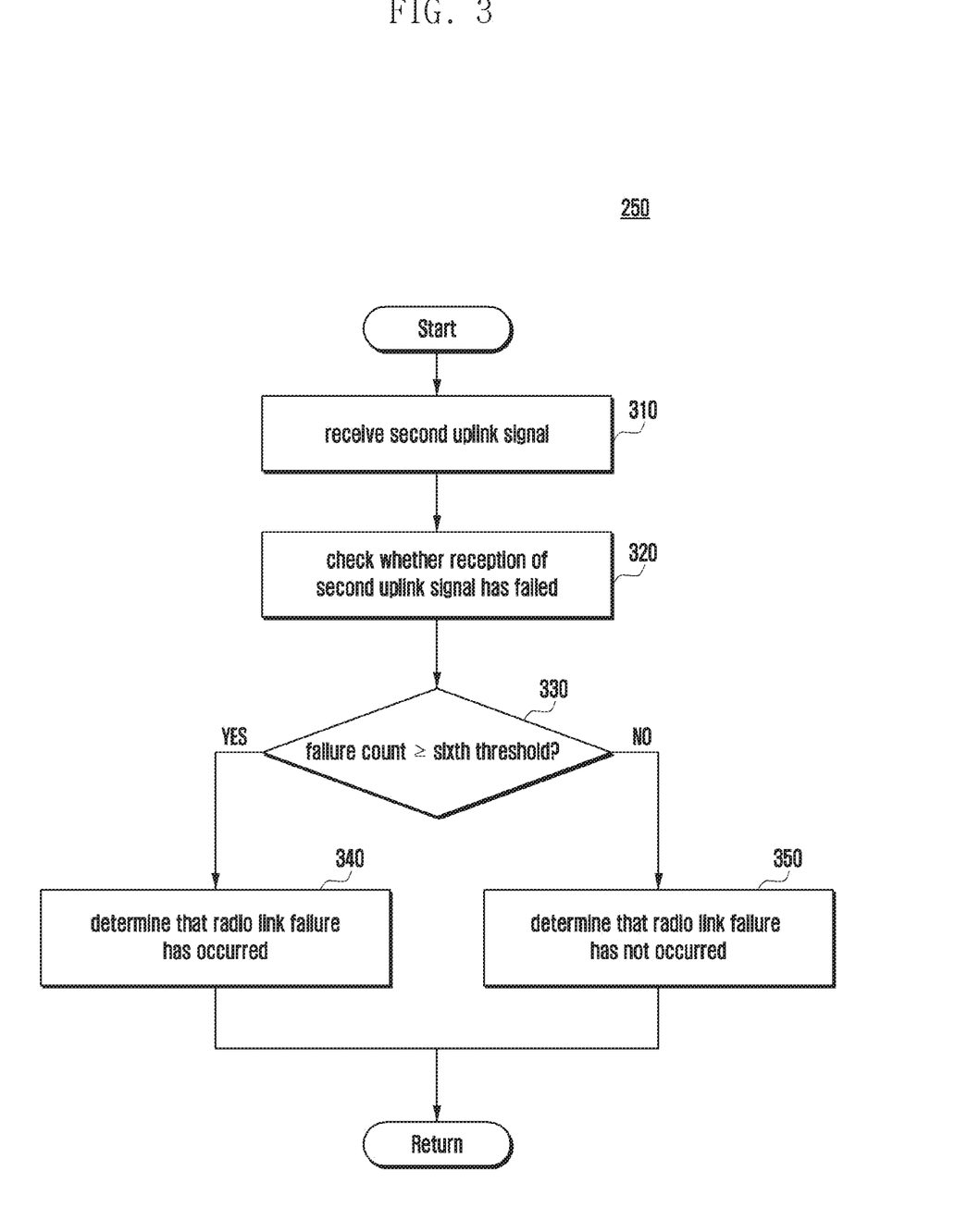
FIG. 3 illustrates a detailed flowchart of an operation for determining a radio link failure according to an embodiment of the disclosure.

FIG. 3 illustrates a detailed flowchart of an operation for determining a radio link failure according to an embodiment of the disclosure.

With reference to FIG. 3, in one embodiment, at operation 310, the base station may receive at least one second uplink signal from the terminal for a preset time. For example, the base station may receive three second uplink signals from the terminal for the preset time.

In one embodiment, at operation 320, the base station may check whether the reception of at least one second uplink signal has failed. For example, if the base station has received three second uplink signals from the terminal, the base station may check whether the reception has failed for each of the three second uplink signals.

In one embodiment, the base station may check whether the reception of a second uplink signal has failed or succeeded by determining whether data decoding of the received second uplink signal is successful, whether the received second uplink signal has passed the CRC, whether the received signal received power (RSRP) is above a preset third threshold, whether the received signal received quality (RSRQ) is above a preset fourth threshold, or whether the block error rate (BLER) is below a preset fifth threshold.

In one embodiment, the base station may determine that the reception of a second uplink signal is successful if the condition described in Table 3 below is satisfied, and may determine that the reception of a second uplink signal has failed if the condition described in Table 4 below is satisfied.

TABLE 3

| condition | item for determination criteria | equal-ity | value | unit of value |
|---|---|---|---|---|
| 1 | successful data decoding | — | — | — |
| 2 | CRC pass | — | — | — |
| 3 | RSRP (received signal power) | ≥ | third threshold | W or dBm |
| 4 | RSRQ (signal quality, e.g.: SNR, SINR) | ≥ | fourth threshold | dB or unitless |
| 5 | BLER (block error rate) | ≤ | fifth threshold | unitless |

TABLE 4

| condition | item for determination criteria | equal-ity | value | unit of value |
|---|---|---|---|---|
| 1 | unsuccessful data decoding | — | — | — |
| 2 | CRC failure | — | — | — |
| 3 | RSRP (received signal power) | < | third threshold | W or dBm |
| 4 | RSRQ (signal quality, e.g.: SNR, SINR) | < | fourth threshold | dB or unitless |
| 5 | BLER (block error rate) | > | fifth threshold | unitless |

In one embodiment, at operation 330, the base station may count the number of second uplink signals that have not been successfully received and determine whether the number of second uplink signals that have not been successfully received is greater than or equal to a preset sixth threshold. In various embodiments, upon determining that the number of second uplink signals that have not been successfully received is greater than or equal to the sixth threshold, at operation 340, the base station may determine that a radio link failure has occurred. Upon determining that the number of second uplink signals that have not been successfully received is less than the sixth threshold, at operation 350, the base station may determine that a radio link failure has not occurred. In one embodiment, the base station may count the number of times that none of the second uplink signals transmitted by the terminal is successfully received during a specific time, and may determine that a radio link failure has occurred if the counted number is greater than or equal to a preset seventh threshold. In various embodiments, the base station may determine that a radio link failure has occurred when the uplink confirmation timer expires.

In one embodiment, the condition for determining a radio link failure may be summarized as in Table 5 below. That is, the radio link failure determination condition described with reference to FIG. 3 is only one of various embodiments of the disclosure. In various embodiments, triggering conditions 1, 2, and 3 shown in Table 5 may be inclusive. That is, when at least one of conditions 1, 2 or 3 is satisfied, the base station may determine whether a radio link failure has occurred.

TABLE 5

| condition | item for determination criteria | equal-ity | value | unit of value |
|---|---|---|---|---|
| 1 | counter for reception failure of second uplink signal | ≥ | sixth threshold | number of times |
| 2 | counter for none reception of second uplink signals during specified time | ≥ | seventh threshold | number of times |
| 3 | uplink confirmation timer | expiry | | second |

Figure 4:
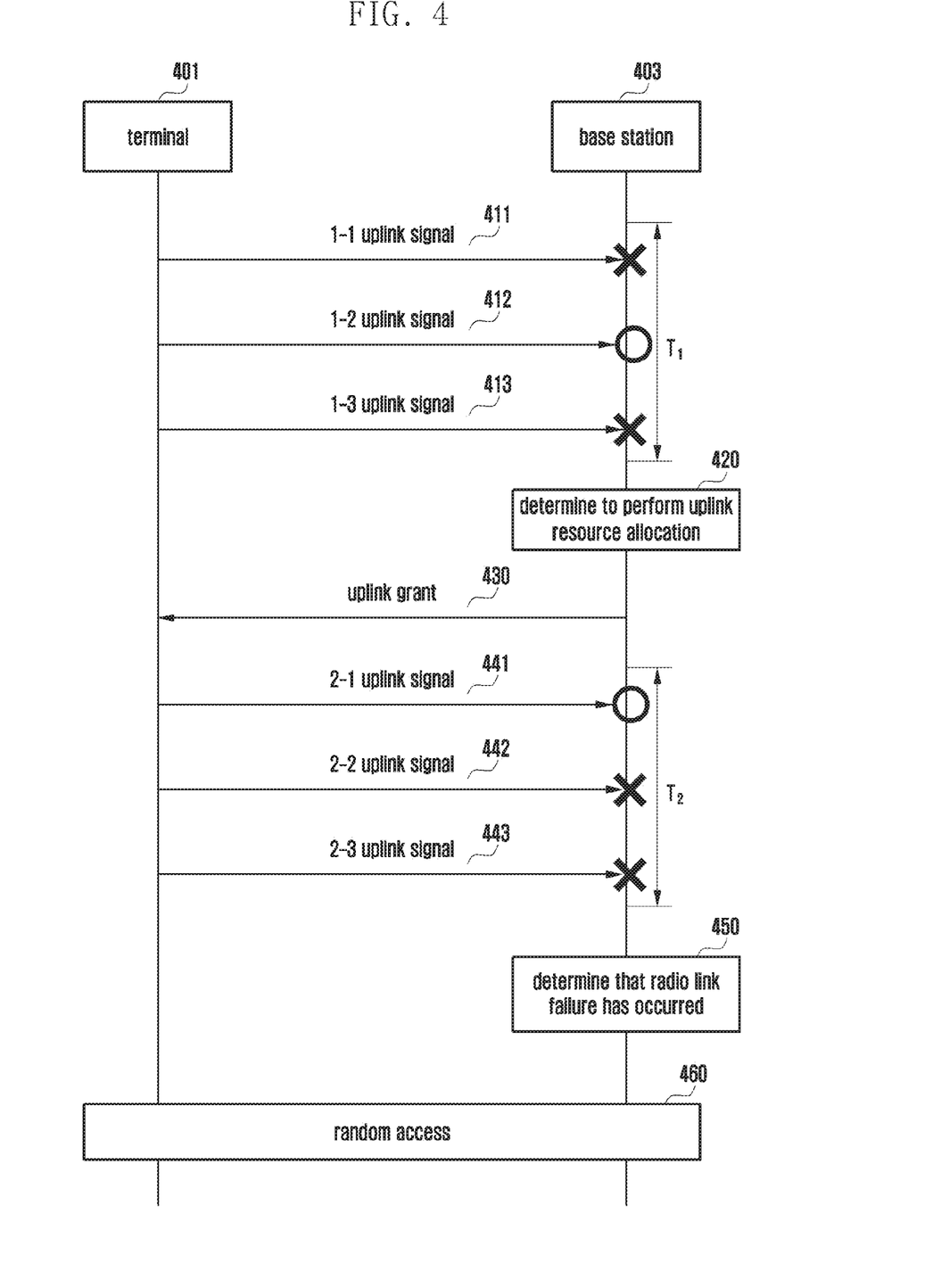
FIG. 4 illustrates a sequence diagram depicting operations between the terminal and the base station according to an embodiment of the disclosure.

FIG. 4 illustrates a sequence diagram depicting operations between the terminal and the base station according to an embodiment of the disclosure.

With reference to FIG. 4, in one embodiment, the terminal 401 may transmit a 1-1 uplink signal 411, a 1-2 uplink signal 412, and a 1-3 uplink signal 413 to the base station 403. In various embodiments, the 1-2 uplink signal 412 may be successfully received by the base station 403, and the 1-1 uplink signal 411 and the 1-3 uplink signal 413 may be not successfully received by the base station 403.

In one embodiment, the base station 403 may determine that there is a possibility of a radio link failure if there are two or more uplink signals that are not successfully received during a specific time $T_1$. In the above example, as the 1-1 uplink signal 411 and the 1-3 uplink signal 413 have not been successfully received, the base station 403 may determine that there is a possibility of a radio link failure.

In one embodiment, to improve the accuracy of radio link failure detection, upon determining that there is a possibility of a radio link failure, at operation 420, the base station 403 may determine to perform uplink resource allocation. In various embodiments, the characteristics of the uplink resources allocated at operation 420 may be different from those of the uplink resources used for transmitting the 1-1 uplink signal, the 1-2 uplink signal, and the 1-3 uplink signal in terms of the available transmission power of the terminal. For a detailed description on operation 420, refer to the description in connection with FIG. 2 and Table 2.

In one embodiment, the base station 403 may transmit a determined uplink grant 430 to the terminal 401, and the terminal 401 may, based on the received uplink grant 430, transmit a 2-1 uplink signal 441, a 2-2 uplink signal 442, and a 2-3 uplink signal 443 to the base station 403. In the above example, the 2-1 uplink signal 441 may be successfully received by the base station 403, and the 2-2 uplink signal 442 and the 2-3 uplink signal 443 may be not successfully received by the base station 403.

In one embodiment, at operation 450, the base station 403 may determine that a radio link failure has occurred if there are two or more uplink signals that are not successfully received during a specific time $T_2$. In the above example, as the 2-2 uplink signal 442 and the 2-3 uplink signal 443 have not been successfully received, the base station 403 may determine that a radio link failure has occurred. In various embodiments, upon determining that a radio link failure has occurred, at operation 460, the base station 403 may perform a random access procedure with the terminal 401.

Meanwhile, the procedure depicted in FIG. 4 is only an embodiment of the disclosure. For example, conditions other than those shown in FIG. 4 (conditions described in Table 1 and Table 5) may be applied as triggering conditions for determining uplink resource allocation and triggering conditions for determining occurrence of a radio link failure.

Figure 5:
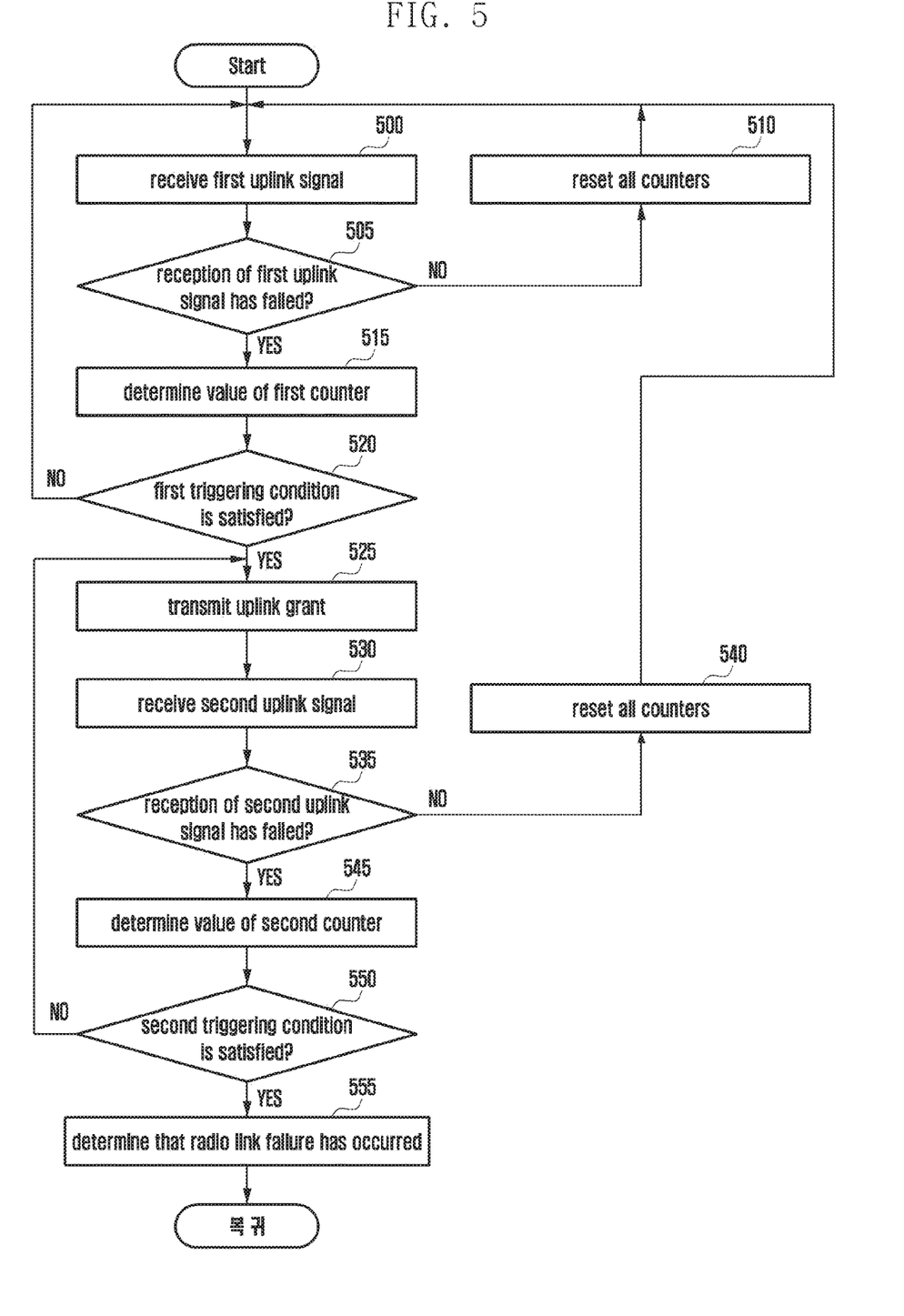
FIG. 5 illustrates a flowchart of a procedure for radio link failure detection according to an embodiment of the disclosure.

FIG. 5 illustrates a flowchart of a procedure for radio link failure detection according to an embodiment of the disclosure.

With reference to FIG. 5, in one embodiment, at operation 500, the base station may receive at least one first uplink signal from the terminal. In various embodiments, at operation 505, the base station may determine whether the reception of the first uplink signal has failed. For example, when the terminal transmits three first uplink signals to the base station at operation 500, the base station may determine whether the reception of each of the three first uplink signals has succeeded or failed at operation 505.

In one embodiment, if the reception of the first uplink signal has succeeded, at operation 510, the base station may reset all the counters (e.g., first counter and second counter listed in FIG. 5). If the reception of the first uplink signal has failed, at operation 515, the base station may determine the value of the first counter. For example, if none of the three first uplink signals transmitted by the terminal is successfully received, the base station may determine the value of the first counter to be 3 at operation 515. If two of the three first uplink signals are successfully received by the base station, the base station may reset the counters to 0 at operation 510.

In one embodiment, at operation 520, the base station may determine whether the first triggering condition is satisfied.

In various embodiments, the base station may determine whether the first triggering condition is satisfied based on the value of the first counter determined at operation 515. In the above example, if the first triggering condition corresponds to a case where the first counter value is 3 or more, the base station may determine that the first triggering condition is satisfied at operation 520.

In one embodiment, upon determining that the first triggering condition is satisfied, at operation 525, the base station may transmit an uplink grant to the terminal. The uplink grant may be for transmitting at least one second uplink signal.

In one embodiment, at operation 530, the base station may receive at least one second uplink signal based on the uplink grant. In various embodiments, the transmission power of the second uplink signal may be greater than that of the first uplink signal.

In one embodiment, at operation 535, the base station may determine whether the reception of the second uplink signal has failed. For example, when the terminal transmits three second uplink signals to the base station at operation 530, the base station may determine whether the reception of each of the three second uplink signals has succeeded or failed at operation 535.

In one embodiment, if the reception of the second uplink signal has succeeded, at operation 540, the base station may reset all the counters (e.g., first counter and second counter listed in FIG. 5). If the reception of the second uplink signal has failed, at operation 545, the base station may determine the value of the second counter. In various embodiments, if none of the three second uplink signals transmitted by the terminal are successfully received, the base station may determine the value of the second counter to be 3 at operation 545. If two of the three second uplink signals are successfully received by the base station, the base station may reset the counters to 0 at operation 540.

In one embodiment, at operation 550, the base station may determine whether the second triggering condition is satisfied. In various embodiments, the base station may determine whether the second triggering condition is satisfied based on the value of the second counter determined at operation 545. In the above example, if the second triggering condition corresponds to a case where the second counter value is 3 or more, the base station may determine that the second triggering condition is satisfied at operation 550.

In one embodiment, upon determining that the second triggering condition is satisfied at operation 550, at operation 555, the base station may determine that a radio link failure has occurred. This is because it is considered that although the terminal transmits an uplink signal with increased transmission power, the base station may be unable to receive the uplink signal.

Figure 6:
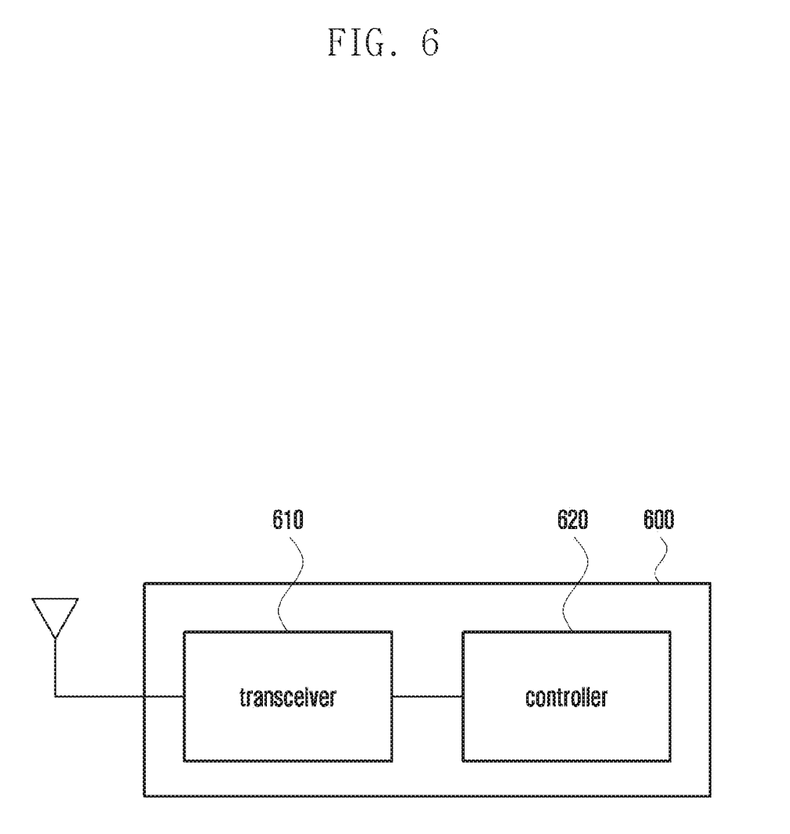
FIG. 6 illustrates a block diagram of a terminal according to an embodiment of the disclosure.

FIG. 6 illustrates a block diagram of a terminal according to an embodiment of the disclosure.

With reference to FIG. 6, in one embodiment, the terminal 600 may include a transceiver 610 and a controller 620. The controller 620 may be configured to receive at least one first downlink signal from a base station, and transmit at least one uplink signal to the base station.

Figure 7:
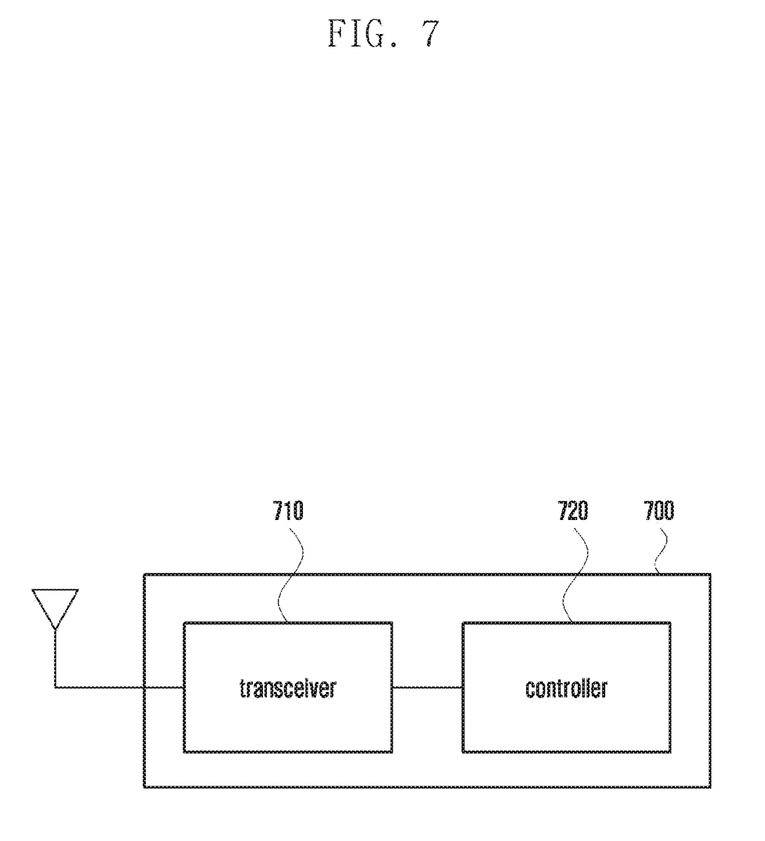
FIG. 7 illustrates a block diagram of a base station according to an embodiment of the disclosure.

FIG. 7 illustrates a block diagram of a base station according to an embodiment of the disclosure.

With reference to FIG. 7, in one embodiment, the base station 700 may include a transceiver 710 and a controller 720. The controller 720 may be configured to receive at least one first uplink signal from a terminal, determine whether to trigger uplink resource allocation by using information based on the at least one first uplink signal, transmit, upon determining to trigger uplink resource allocation, an uplink grant to the terminal, receive at least one second uplink signal from the terminal based on the uplink grant, and determine whether a radio link failure has occurred based on the at least one second uplink signal.

Figure 8:
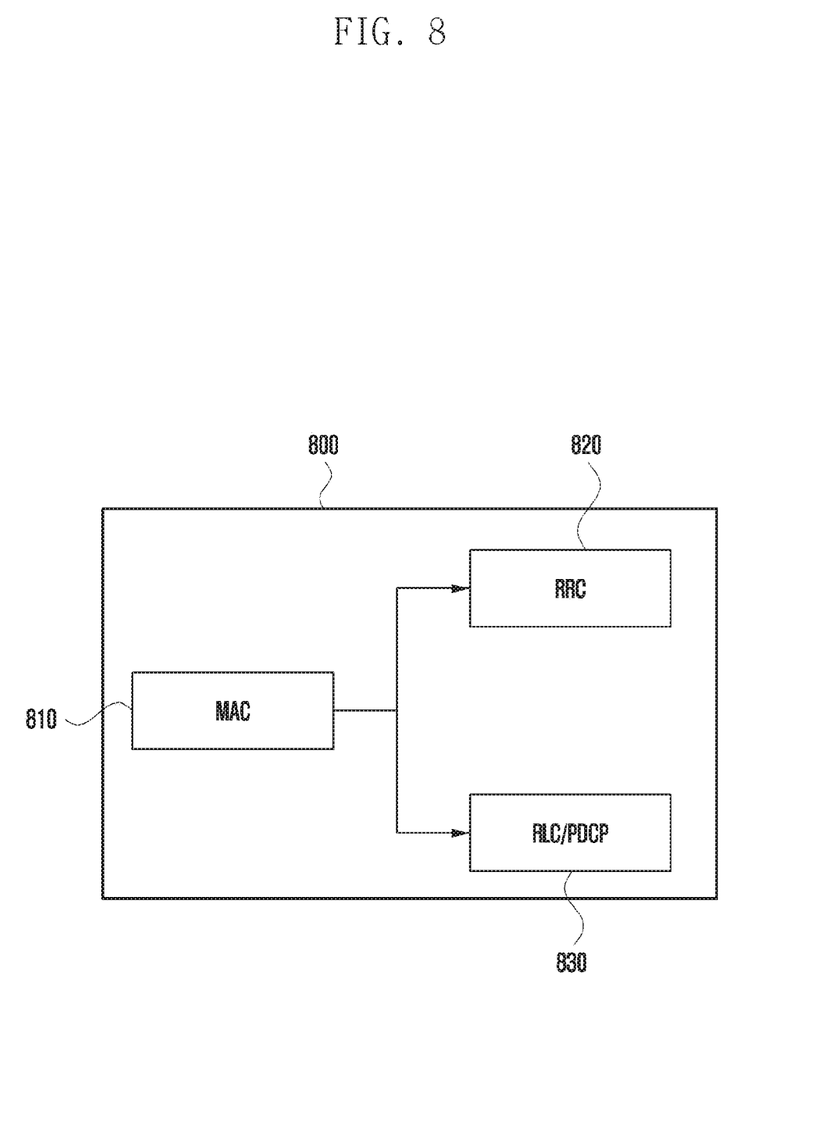
FIG. 8 illustrates layers in the base station according to an embodiment of the disclosure.

FIG. 8 illustrates layers in the base station according to an embodiment of the disclosure.

In one embodiment, the operations of the base station illustrated in FIGS. 2 to 5 may be managed by the medium access control (MAC) layer 810. Meanwhile, it is necessary to provide information on the radio link failure detection to the radio resource control (RRC) layer 820, the radio link control (RRC) layer 830, and the packet data convergence protocol (PDCP) layer 730 in addition to the MAC layer 810.

In one embodiment, when an uplink radio link failure is detected by the operations illustrated in FIGS. 2 to 5, the MAC layer 810 may transmit an indicator indicating detection of a radio link failure and performance of random access to the RLC/PDCP layer 830. In various embodiments, when the random access is successfully performed, the MAC layer 810 may transmit an indicator indicating that the random access is successful to the RLC/PDCP layer 830. When the random access is not successfully performed, the MAC layer 810 may transmit an indicator indicating that the random access is not successful to the RRC layer 820.

According to an embodiment of the disclosure, a method for a base station to determine a radio link failure (RLF) in a wireless communication system may include: receiving at least one first uplink signal from a terminal; determining whether to trigger uplink resource allocation by using information based on the at least one first uplink signal; transmitting, upon determining to trigger uplink resource allocation, an uplink grant to the terminal; receiving at least one second uplink signal from the terminal based on the uplink grant; and determining whether a radio link failure has occurred based on the at least one second uplink signal.

In one embodiment, the strength of first power used to transmit the at least one first uplink signal may be lower than the strength of second power used to transmit the at least one second uplink signal.

In one embodiment, determining whether to trigger uplink resource allocation may include determining to trigger uplink resource allocation if the number of times that the reception of the at least one first uplink signal fails is greater than or equal to a preset first threshold or determining to trigger uplink resource allocation if none of the at least one first uplink signal transmitted by the terminal is received during a preset first time.

In one embodiment, the uplink grant may be related to at least one of a resource used by the terminal to transmit data to the base station, a resource used by the terminal to transmit a sounding reference signal (SRS) to the base station, a resource used by the terminal to transmit channel state information (CSI) to the base station, or a resource used by the terminal to transmit a random access preamble to the base station.

In one embodiment, when the uplink grant is related to a resource for the terminal to transmit data to the base station, the modulation and coding scheme (MCS) of the resource for transmitting the data may be less than or equal to a preset second threshold.

In one embodiment, when the uplink grant is related to a resource for the terminal to transmit data to the base station, the frequency domain of the resource for transmitting the data may be less than or equal to a preset third threshold.

In one embodiment, determining whether a radio link failure has occurred may include: receiving at least one second uplink signal from the terminal for a preset second time; checking whether the reception of the at least one second uplink signal has failed; and determining that a radio link failure has occurred if the number of second uplink signals that have not been successfully received among the at least one second uplink signal transmitted during the second time is greater than or equal to a preset fourth threshold.

In one embodiment, it may be determined that the reception of the at least one second uplink signal has failed when decoding of the at least one second uplink signal fails or when a cyclic redundancy check (CRC) of the at least one second uplink signal fails.

In one embodiment, it may be determined that the reception of the at least one second uplink signal has failed when the received signal strength of the at least one second uplink signal is less than or equal to a preset fifth threshold or when the block error rate of the at least one second uplink signal is greater than or equal to a preset sixth threshold.

In one embodiment, upon determining that a radio link failure has occurred, the method may further include performing a random access procedure with the terminal.

According to an embodiment of the disclosure, a base station may include: a transceiver; and a controller configured to receive at least one first uplink signal from a terminal, determine whether to trigger uplink resource allocation by using information based on the at least one first uplink signal, transmit, upon determining to trigger uplink resource allocation, an uplink grant to the terminal, receive at least one second uplink signal from the terminal based on the uplink grant, and determine whether a radio link failure has occurred based on the at least one second uplink signal.

In one embodiment, the strength of first power used to transmit the at least one first uplink signal may be lower than the strength of second power used to transmit the at least one second uplink signal.

In one embodiment, the controller may be configured to determine to trigger uplink resource allocation if the number of times that the reception of the at least one first uplink signal fails is greater than or equal to a preset first threshold or if none of the at least one first uplink signal transmitted by the terminal is received during a preset first time.

In one embodiment, the uplink grant may be related to at least one of a resource used by the terminal to transmit data to the base station, a resource used by the terminal to transmit a sounding reference signal (SRS) to the base station, a resource used by the terminal to transmit channel state information (CSI) to the base station, or a resource used by the terminal to transmit a random access preamble to the base station.

In one embodiment, when the uplink grant is related to a resource for the terminal to transmit data to the base station, the modulation and coding scheme (MCS) of the resource for transmitting the data may be less than or equal to a preset second threshold.

In one embodiment, when the uplink grant is related to a resource for the terminal to transmit data to the base station, the frequency domain of the resource for transmitting the data may be less than or equal to a preset third threshold.

In one embodiment, the controller may be configured to receive at least one second uplink signal from the terminal for a preset second time, check whether the reception of the at least one second uplink signal has failed, and determine that a radio link failure has occurred if the number of second uplink signals that have not been successfully received among the at least one second uplink signal transmitted during the second time is greater than or equal to a preset fourth threshold.

In one embodiment, the controller may be configured to determine that the reception of the at least one second uplink signal has failed when decoding of the at least one second uplink signal fails or when a cyclic redundancy check (CRC) of the at least one second uplink signal fails.

In one embodiment, the controller may be configured to determine that the reception of the at least one second uplink signal has failed when the received signal strength of the at least one second uplink signal is less than or equal to a preset fifth threshold or when the block error rate of the at least one second uplink signal is greater than or equal to a preset sixth threshold.

In one embodiment, upon determining that a radio link failure has occurred, the controller may be configured to perform a random access procedure with the terminal.

Hereinabove, various embodiments of the disclosure have been shown and described for the purpose of illustration without limiting the subject matter of the disclosure. It should be understood that many variations and modifications of the basic inventive concept described herein will still fall within the spirit and scope of the disclosure as defined in the appended claims and their equivalents. In addition, some of the embodiments may be combined with each other if necessary for operation. For example, some of the methods proposed in the disclosure may be combined with each other and applied to a base station and a terminal.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a base station in a wireless communication system, the method comprising:
    identifying whether at least one first uplink signal transmitted from a terminal is successfully received;
    determining whether to trigger an uplink resource allocation based on a number of times that reception of the at least one first uplink signal fails;
    in case that the uplink resource allocation is triggered, transmitting, to the terminal, an uplink grant signal;
    identifying whether at least one second uplink signal transmitted, according to the uplink grant signal, from the terminal is successfully received; and
    determining whether an uplink radio link failure occurs based on the identification of whether the at least one second uplink signal transmitted, according to the uplink grant signal, from the terminal is successfully received.

2. The method of claim 1, wherein a first transmission power of the at least one first uplink signal is lower than a second transmission power of the at least one second uplink signal.

3. The method of claim 1, wherein determining whether to trigger the uplink resource allocation comprises:
    determining to trigger the uplink resource allocation in case that the number of times that a reception of the at least one first uplink signal fails is greater than or equal to a first threshold.

4. The method of claim 1, wherein the uplink grant signal is related to at least one of a resource for transmitting data, a resource for transmitting a sounding reference signal (SRS), a resource for transmitting channel state information (CSI), or a resource for transmitting a random access preamble.

5. The method of claim 1, wherein the uplink grant signal is transmitted via downlink control information (DCI).

6. The method of claim 5, wherein the DCI indicates a modulation and coding scheme (MCS) value of the at least one second uplink signal.

7. The method of claim 1, wherein determining whether the uplink radio link failure occurs comprises:
    determining that the uplink radio link failure occurs in case that a number of times that a reception of the at least one second uplink signal fails is greater than or equal to a second threshold.

8. The method of claim 7, wherein whether the reception of the at least one second uplink signal fails or not is based on at least one of data decoding result, cyclic redundancy check (CRC), reference signal received power (RSRP), reference signal received quality (RSRQ), or block error rate (BLER).

9. The method of claim 1, wherein determining whether the uplink radio link failure occurs comprises:
    determining that the uplink radio link failure occurs in case that an uplink confirmation timer expires.

10. The method of claim 1, further comprising:
    in case of determining that the uplink radio link failure occurs, performing a random access procedure with the terminal.

11. A base station in a wireless communication system, the base station comprising:
    a transceiver; and
    a controller operably connected to the transceiver, the controller configured to:
        identify whether at least one first uplink signal transmitted from a terminal is successfully received,
        determine whether to trigger an uplink resource allocation based on a number of times that a reception of the at least one first uplink signal fails,
        in case that the uplink resource allocation is triggered, transmit, to the terminal, an uplink grant signal,
        identify whether at least one second uplink signal transmitted, according to the uplink grant signal, from the terminal is successfully received, and
        determine whether an uplink radio link failure occurs based on the identification of whether the at least one second uplink signal transmitted, according to the uplink grant signal, from the terminal is successfully received.

12. The base station of claim 11, wherein a first transmission power of the at least one first uplink signal is lower than a second transmission power of the at least one second uplink signal.

13. The base station of claim 11, wherein, to determine whether to trigger the uplink resource allocation, the controller is configured to:
    determine to trigger the uplink resource allocation in case that the number of times that a reception of the at least one first uplink signal fails is greater than or equal to a first threshold.

14. The base station of claim 11, wherein the uplink grant signal is related to at least one of a resource for transmitting data, a resource for transmitting a sounding reference signal (SRS), a resource for transmitting channel state information (CSI), or a resource for transmitting a random access preamble.

15. The base station of claim 11, wherein the uplink grant signal is transmitted via downlink control information (DCI).

16. The base station of claim 15, wherein the DCI indicates a modulation and coding scheme (MCS) value of the at least one second uplink signal.

17. The base station of claim 11, wherein, to determine whether the uplink radio link failure occurs, the controller is configured to:
  determine that the uplink radio link failure occurs in case that a number of times that a reception of the at least one second uplink signal fails is greater than or equal to a second threshold.

18. The base station of claim 17, wherein whether the reception of the at least one second uplink signal fails or not is based on at least one of data decoding result, cyclic redundancy check (CRC), reference signal received power (RSRP), reference signal received quality (RSRQ), or block error rate (BLER).

19. The base station of claim 11, wherein, to determine whether the uplink radio link failure occurs, the controller is configured to determine that the uplink radio link failure occurs in case that an uplink confirmation timer expires.

20. The base station of claim 11, wherein the controller is further configured to:
  in case of determining that the uplink radio link failure occurs, perform a random access procedure with the terminal.

* * * * *